United States Patent
Ternullo (10) Patent No.: US 6,463,487 B1
(45) Date of Patent: Oct. 8, 2002

(54) ADJUSTABLE POINTER CONTROLLER WITH VOLTAGE THRESHOLDS CONTROL FOR CONVEYING USER INPUTS TO A COMPUTER EQUIPPED WITH A USER PORT OR PS/2 PORT

(75) Inventor: Noah J. Ternullo, Endicott, NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/329,872

(22) Filed: Jun. 11, 1999

(51) Int. Cl.[7] .......................... G06F 13/12; G06F 13/28; G06F 13/00
(52) U.S. Cl. .............................. 710/63; 710/64; 710/73; 710/129
(58) Field of Search .............................. 710/63, 64, 73, 710/100, 129; 361/601

(56) References Cited

U.S. PATENT DOCUMENTS

| | | | |
|---|---|---|---|
| 5,249,272 A | 9/1993 | Stern | 395/275 |
| 5,513,302 A | 4/1996 | Tsai | 395/114 |
| 5,521,596 A | 5/1996 | Selker et al. | 341/22 |
| 5,615,083 A | 3/1997 | Burnett | 361/686 |
| 5,640,179 A | 6/1997 | Lake | 345/161 |
| 5,731,804 A | 3/1998 | Rosenburg | 345/156 |
| 5,748,180 A | 5/1998 | Inukai | 345/161 |
| 5,754,890 A * | 5/1998 | Holmdahl et al. | 710/63 |
| 5,771,038 A | 6/1998 | Wang | 345/163 |
| 5,786,806 A | 7/1998 | Fester | 345/161 |
| 5,793,356 A | 8/1998 | Svancarek et al. | 345/161 |
| 5,920,734 A * | 7/1999 | Holmdahl | 361/601 |
| 5,935,224 A * | 8/1999 | Svancarek et al. | 710/63 |
| 5,984,731 A * | 11/1999 | Laity | 439/676 |
| 5,991,546 A * | 11/1999 | Chan et al. | 395/882 |
| 6,058,441 A * | 5/2000 | Shu | 710/100 |
| 6,098,130 A * | 8/2000 | Wang | 710/100 |
| 6,151,653 A * | 11/2000 | Lin et al. | 710/129 |
| 6,247,075 B1 * | 6/2001 | Wang et al. | 710/63 |
| 6,279,060 B1 * | 8/2001 | Luke et al. | 710/64 |
| 6,285,356 B1 * | 9/2001 | Armstrong | 345/167 |

* cited by examiner

Primary Examiner—Thomas Lee
Assistant Examiner—Chun Cao
(74) Attorney, Agent, or Firm—Perkins, Smith & Cohen LLP; Christine M. Kuta; Jacob N. Erlich (57) ABSTRACT

A device enables a joystick to be connected to a PS/2® port converts signals from the joystick to mouse-like signals so that neither the software nor the hardware needs to be changed in order to use the joystick instead of the mouse. The directional signals of the joystick are converted to mouse-equivalent signals and discrete signals from the joystick are translated by a device formed and configured to a PS/2® port.

24 Claims, 7 Drawing Sheets

ADJUSTABLE POINTER CONTROLLER WITH VOLTAGE THRESHOLDS CONTROL FOR CONVEYING USER INPUTS TO A COMPUTER EQUIPPED WITH A USER PORT OR PS/2 PORT

FIELD OF THE INVENTION

This invention relates generally to computer input devices and more particularly to providing an adapter and signal converter to the PS/2® port for non-PS/2 input devices such as a joystick.

BACKGROUND OF THE INVENTION

A mouse is one of the most common computer input devices found on computer systems today. The mouse controls the movement of a cursor or a pointer on a computer display screen. As the mouse is moved by the computer user, the pointer on the display screen moves. A mouse has at least one button and sometimes as many as three, which have different input functions depending on the program running on the computer.

The mouse frees the user to a large extent from using the keyboard. In particular, the mouse is important for graphical user interfaces because the user can simply point to options and objects and click a mouse button. The mouse is also useful for graphics programs that allow a user to draw pictures by using the mouse like a pen, pencil, or paintbrush.

There are three basic types of mice: mechanical, optomechanical, and optical. The mechanical mouse has a rubber or metal ball on its underside that can roll in any direction. Mechanical sensors within the mouse detect the direction the ball is rolling and move the screen pointer accordingly.

The optomechanical mouse is similar to the mechanical mouse, but uses optical sensors to detect motion of the ball.

The optical mouse uses a laser to detect the mouse's movement. The mouse is moved along a special mat with a grid that is used as a frame of reference by the optical mechanism. Optical mice have no mechanical moving parts. They respond more quickly and precisely than mechanical and optomechanical mice, but they are also more expensive.

Typically a mouse connects to a PC-type computer in one of the following ways:

1. A serial mouse connects directly to an RS-232C serial port or a PS/2® port. This is the simplest type of connection; or
2. A PS/2® mouse connects to a PS/2® port.

Commonly, the mouse is connected to the PS/2® port on a computer to leave the serial port available for other devices such as a modem. The PS/2® port is a standard developed by International Business Machines, Inc. for connecting a mouse or keyboard to a PC. The PS/2® port supports a six pin connector. A typical pinout for the six pin connector is shown in Table 1. Only four of the six pins are used for the mouse. Pins 3 and 4 are ground and power respectively. Pin 5 is for the clock and pin 1 is the data connection.

TABLE 1

| Pin | Signal |
| --- | --- |
| 1 | Mouse data |
| 2 | Not connected |

TABLE 1-continued

| Pin | Signal |
| --- | --- |
| 3 | Ground (GND) |
| 4 | +5 Volts DC |
| 5 | Mouse clock |
| 6 | Not connected |

The mouse is not always a convenient pointing solution for computers, nor is it always the most effective pointing solution. For example, in moving vehicles such as a helicopter, a mouse can be difficult to use and somewhat inconvenient to fit into the pilot space. People with certain handicaps also may have difficulty using the mouse. Instead, there are other pointing devices that may be used in the place of the mouse. These devices include a joystick, a button box, a trackball, and a glide point. These alternatives, however, require specific dependencies to the operating system or special driver software. The joystick, for instance, is typically an analog device where a mouse is typically a digital device. In order to easily replace the mouse with a joystick, for example, one needs a D/A converter and a way of converting the device's control signals to mouse-like control signals.

It is desirable to have a way of replacing the mouse on a PC computer with a different pointer controller device without modifying hardware or software on the computer.

It is an object of the present invention to provide a method and apparatus to use a joystick in conjunction with a standard PS/2® port.

It is another object of the present invention to provide a method and apparatus to convert signals from non-mouse pointer controllers to mouse-like signals.

SUMMARY OF THE INVENTION

The problems of using alternative pointer controllers in conjunction with a standard PS/2® port are solved by the present invention of an embedded mouse controller.

A pointer controller interface enables a joystick to be connected to a PS/2® port converts signals from the joystick to mouse-like signals so that neither the software nor the hardware needs to be changed in order to use the joystick instead of the mouse.

The directional signals of the joystick are converted by the pointer controller interface to mouse-equivalent signals and discrete signals from the joystick are translated by a device formed and configured to a PS/2® port.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
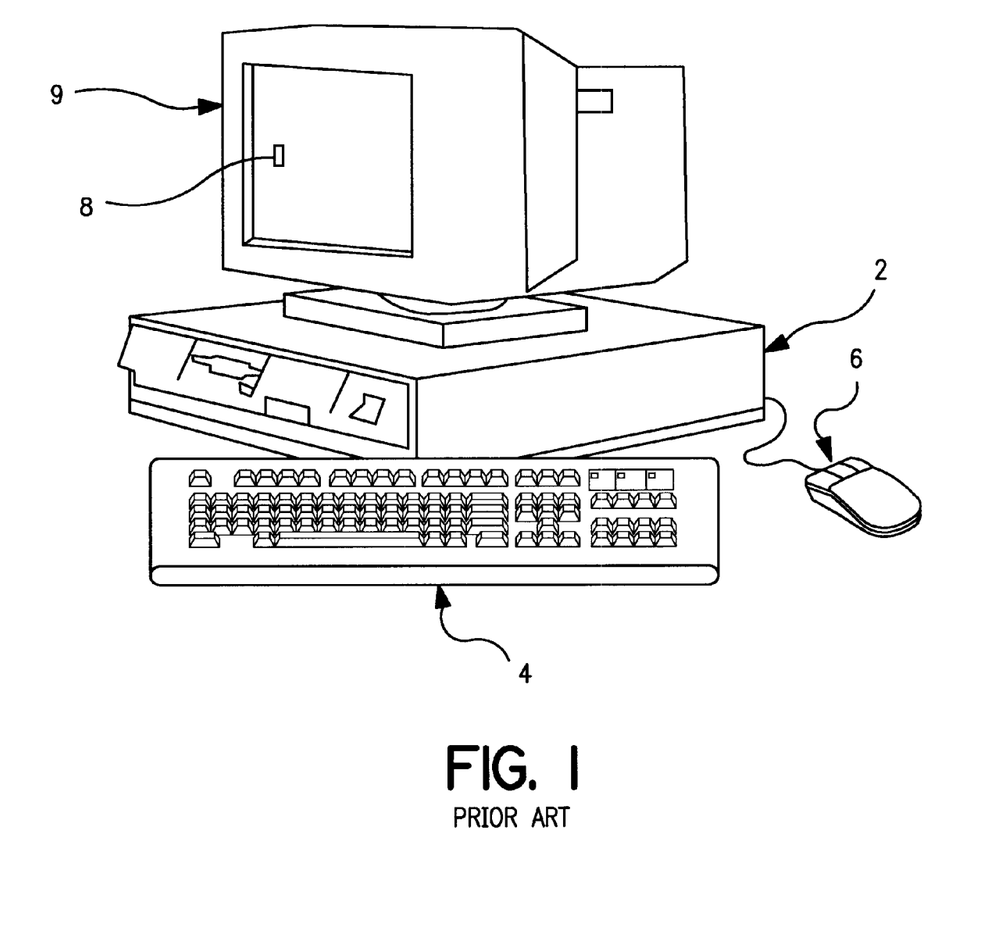
FIG. 1 is a pictorial representation of a prior art computer system.

FIG. 1 shows a desktop computer 2 with input devices, namely a keyboard 4 and a mouse 6. The mouse 6 controls the movement of a cursor 8 or a pointer on a computer display screen 9. As the mouse is moved by the computer user, the pointer 8 on the display screen 9 moves. A mouse 6 has at least one button and sometimes as many as three, which have different input functions depending on the program running on the computer.

Figure 2:
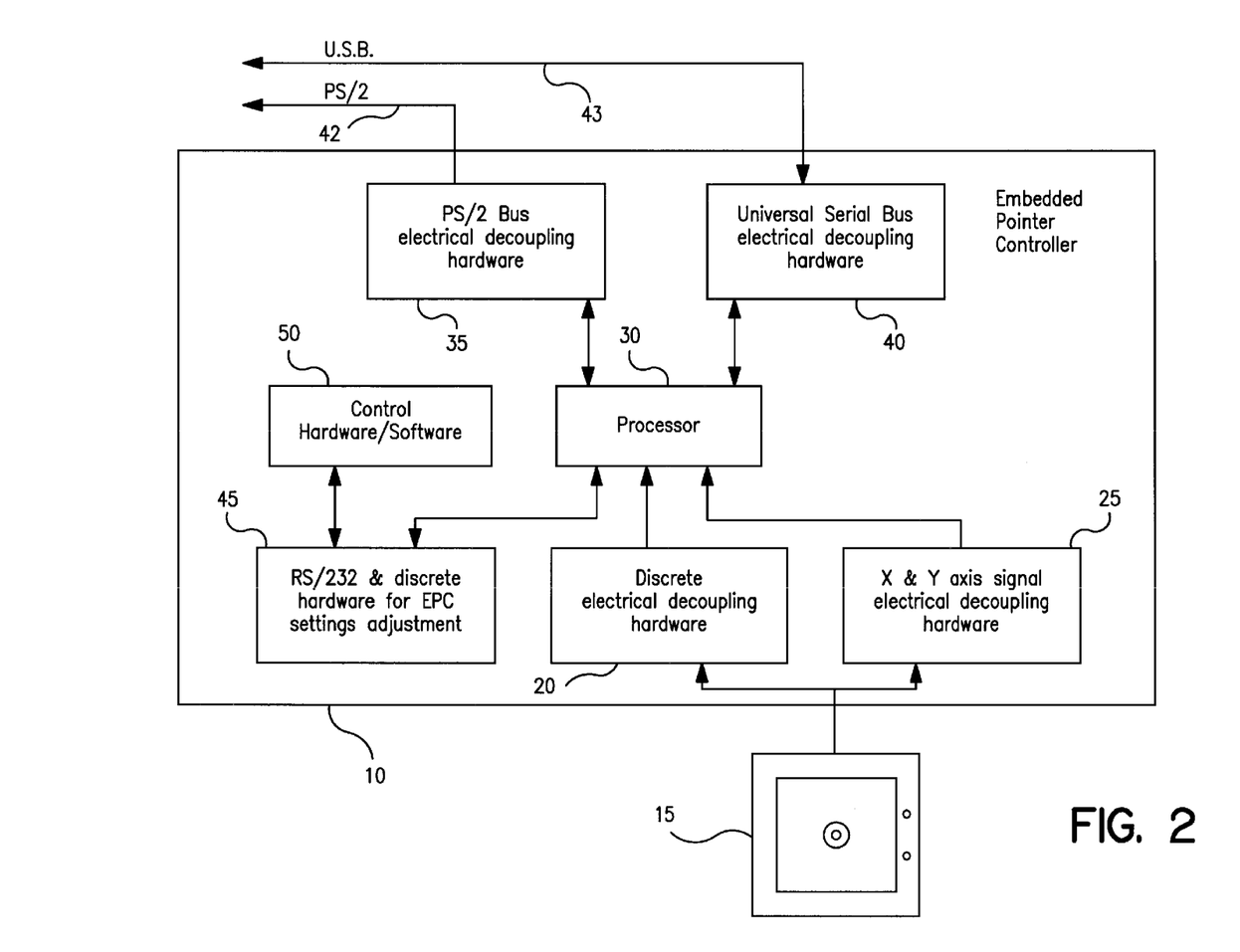
FIG. 2 is a block diagram of the embedded mouse controller with a joystick according to principles of the present invention.

FIG. 2 is a block diagram of an embedded pointer controller system 10 according to principles of the present invention. The present embodiment of the invention has a joystick 15 for providing pointer information instead of the mouse. The joystick 15 is used by a user to generate X and Y axis signals and at least one discrete signal which simulate mouse action. In alternative embodiments, the discrete signals could number up to three in order to simulate a multiple-button mouse. Alternative devices for generating X and Y axis directional signals and discrete signals include a button box and a dial box. Movement of the joystick left, right, up and down generates the X and Y axis directional signals. Buttons on the joystick generate discrete signals that simulate signals from mouse buttons.

Interfacing between the joystick 15 and an embedded pointer controller (EPC) 10 are a discrete signal electrical decoupler 20 and an X and Y axis signal electrical decoupler 25. The discrete signal electrical decoupler 20 decouples the pointer movement transducers (i.e. the joystick in the present embodiment of the invention) discrete electrical system from the embedded pointer controller electrical system. The X and Y axis signal electrical decoupler 25 decouples the pointer movement transducers analog electrical system from the embedded mouse controller's electrical system. These decouplers protect the EPC 10 from extraneous power noise, electrical surges and so on. The invention may be practiced without them.

A processor 30 takes signals from the decouplers 20, 25 and processes them for transmission to a device with a pointer. The processor 30 digitally quantifies the X and Y axis directional signals to at least 8 bit words. The processor 30 determines through a PS/2® interface 35 and a Universal Serial bus (USB) interface 40 which type of bus is to receive the joystick signals. The PS/2® interface 35 determines if the embedded pointer controller 10 is connected to valid external PS/2® bus 42 and transfers data from the processor 30 to the external PS/2® bus 42. The USB interface 40 determines if the embedded pointer controller 10 is connected to a valid external USB 43 and transfers data from the processor 30 to the USB 43. A settings adjustment device 45 retains user-input settings for the embedded pointer controller 10. The control hardware/software 50 allows a user to set the settings retained by the settings adjustment device 45. Settings included fixing pointer rate of movement, setting rate of pointer movement, and setting pointer acceleration. Settings further include sensitivity of the pointer controller interface to signals from the joystick or other transducer. The control hardware/software also associates the discrete signals to specific actions, such as translating a particular joystick button to a double click of a left mouse button. In alternative embodiments, the user interface could be a set of buttons and a multifunction LCD. Alternatively, input could be sent by software on the receiving computer to the EPC through either the USB or the RS/232 port.

Figure 3:
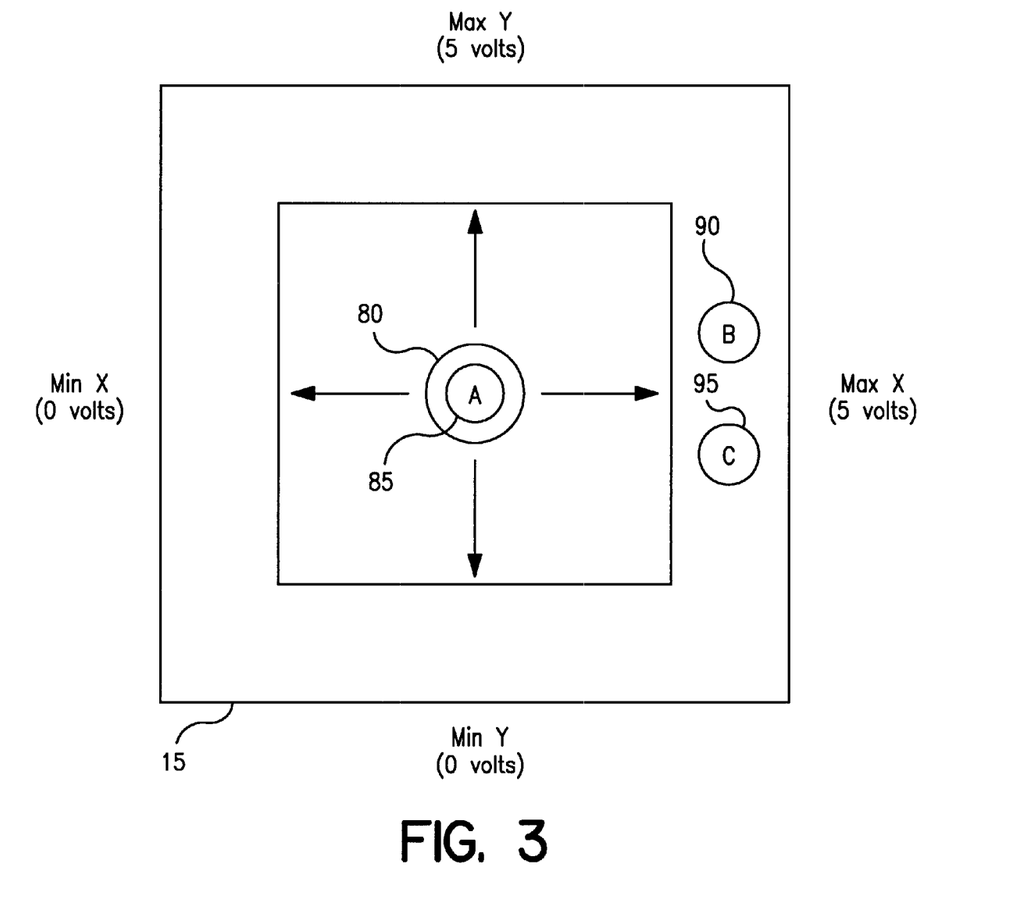
FIG. 3 is a top view diagram of a joystick.

FIG. 3 is a top view of a joystick 15 such as one used in the present invention. The joystick 15 has a central lever 80 which may be pushed in the X and Y directions. The joystick signals are in the range of 0 to 5 volts. The joystick in the present embodiment of the invention has three buttons for sending discrete signals. A first button 85 is on the joystick lever 80. A second button 90, and a third button 95 are located, in the present embodiment of the invention, off the joystick lever 80. As discussed above, the signals generated by the three mouse buttons may be assigned to particular activities. For example, first button 85 may be made equivalent to the "select" button on a mouse.

Figure 4:
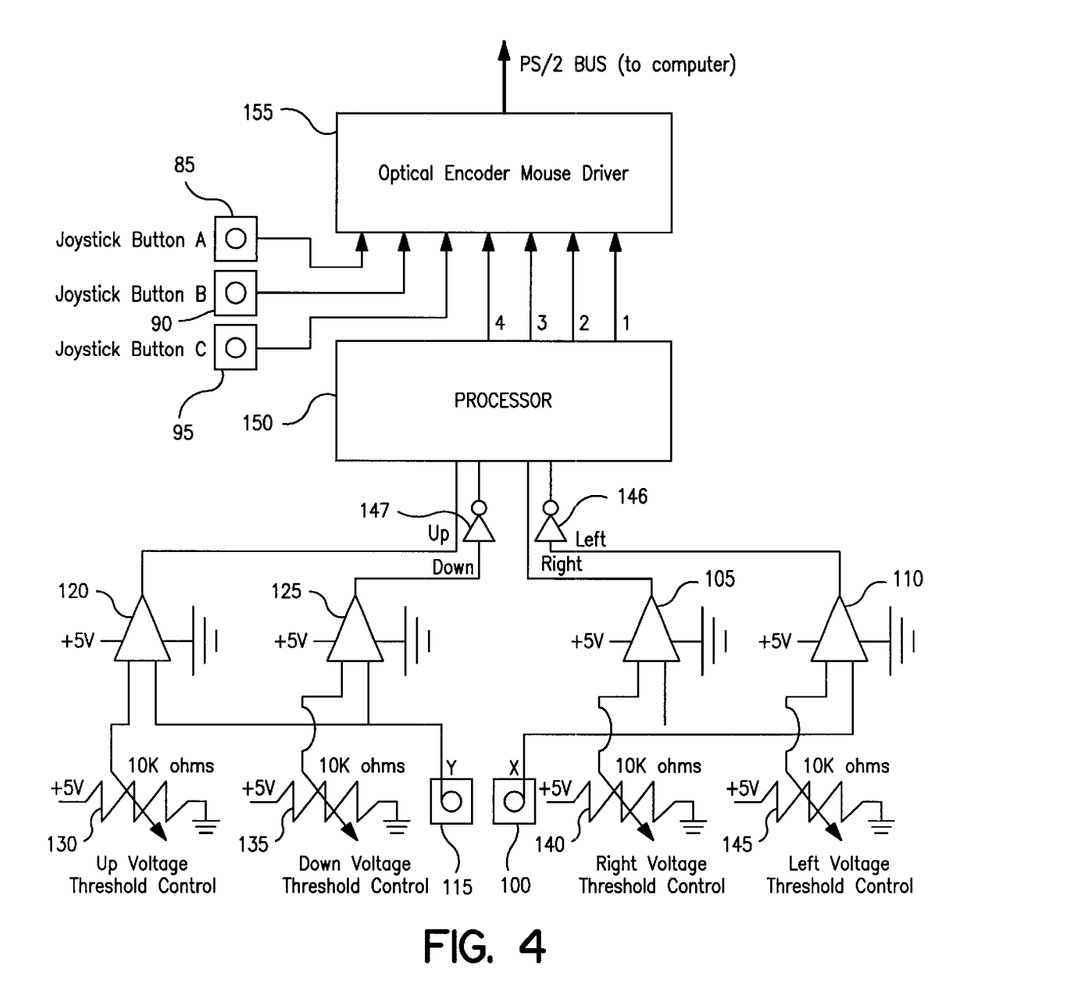
FIG. 4 is a combination block and schematic circuit diagram of the embedded mouse controller of FIG. 2 according to principles of the present invention.

FIG. 4 is a combination block and schematic circuit diagram of an alternative embodiment of the embedded pointer controller 10 of FIG. 2 according to principles of the present invention. Signals from an X-direction transducer 100 provide one input to each of first 105 and second 110 comparators. Signals from a Y-direction transducer 115 provide one input to each of third 120 and fourth 125 comparators. An "Up Voltage" threshold control 130 is implemented using a variable resistor and provides a second input to third comparator 120. A "Down Voltage" threshold control 135 is implemented using a variable resistor and provides a second input to fourth comparator 125. A "Right Voltage" threshold control 140 is implemented using a variable resistor and provides a second input to first comparator 105. A "Left Voltage" threshold control 145 is implemented using a variable resistor and provides a second input to second comparator 110. The threshold controls establish a minimum and a maximum voltage threshold for pointer movement within the 5 volt signal range. The signals from the second comparator 110 and fourth comparator 125 are transmitted through inverters to create "left" and "down" signals. The signals from the first comparator 105 and third comparator 120 and from the inverters are received by the processor 150 that processes the signals as described above in the discussion of FIG. 2. The processor 150 provides up, down, right and left directional signals to an optical encoder mouse driver 155. The optical encoder mouse driver 155 also receives the discrete signals from the buttons 85, 90, 95 on the joystick 15. These signals are transmitted on the PS/2® bus to a computer having a pointer to be moved according to the directional and discrete button signals.

Figure 5:
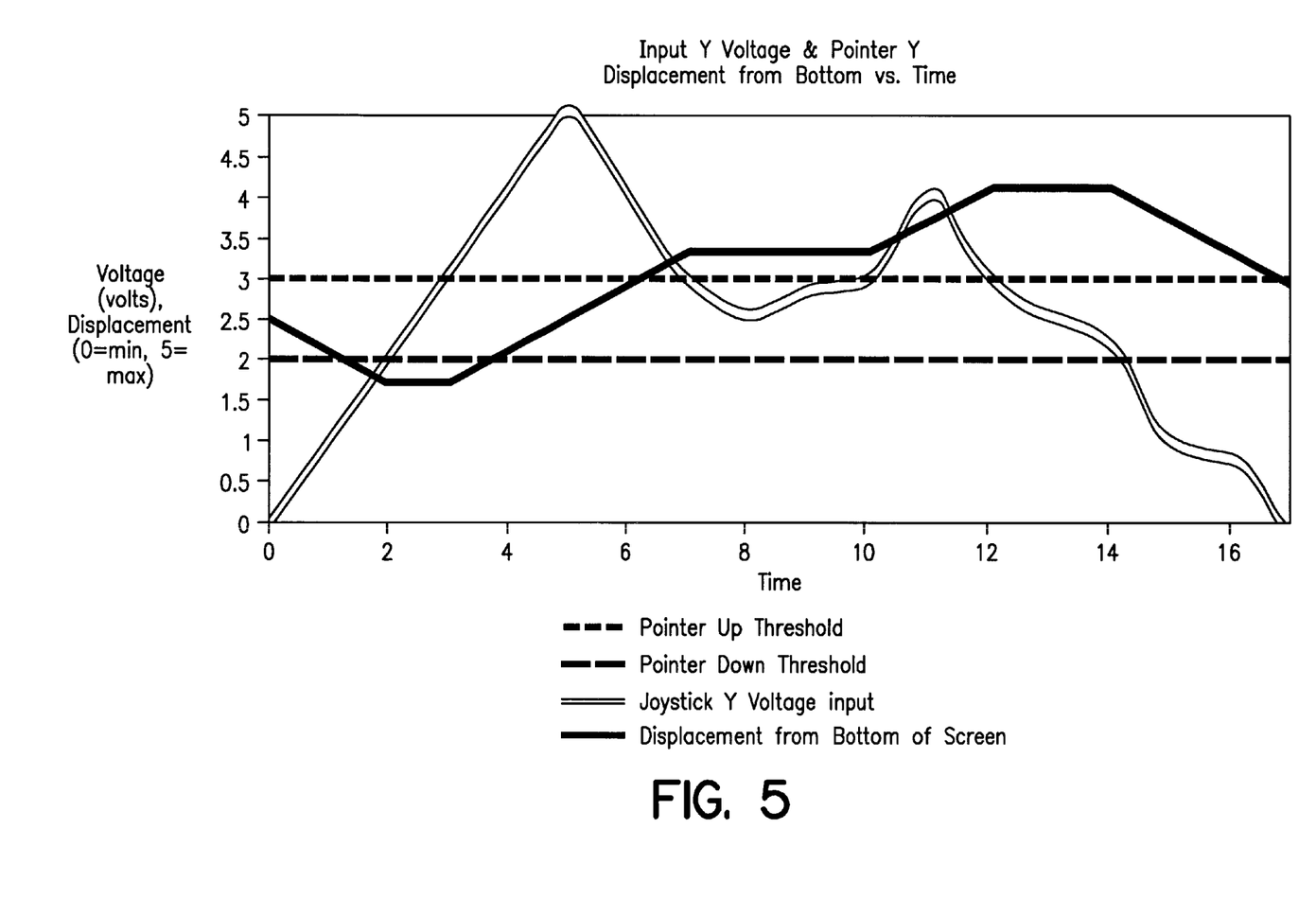
FIG. 5 is a graph of joystick y voltage input and computer screen pointer displacement using the present invention vs. time.

FIG. 5 is a graph of an example of joystick y voltage input and computer screen pointer displacement vs. time, generated using an embodiment of the present invention. The y axis represents both joystick Y direction voltage input in volts and pointer displacement relative to the bottom of the computer screen where 0 is the bottom of the screen and 5 is the top of the screen. The minimum voltage threshold in this example is 2 volts and the maximum voltage threshold in this example is 3 volts. That is, where the joystick signal is at 2 volts and below, the pointer moves toward the bottom of the computer screen and where the joystick signal is at 3 volts and above, the pointer moves toward the top of the computer screen. The joystick Y voltage is shown as a dotted line and the displacement of the pointer from the bottom of the screen is shown as a solid line. The minimum and maximum voltage threshold may be altered to make the embedded mouse controller more or less sensitive to voltage changes. The equivalent circuitry are present and the equivalent actions occur for the X axis directional signals.

Figure 6:
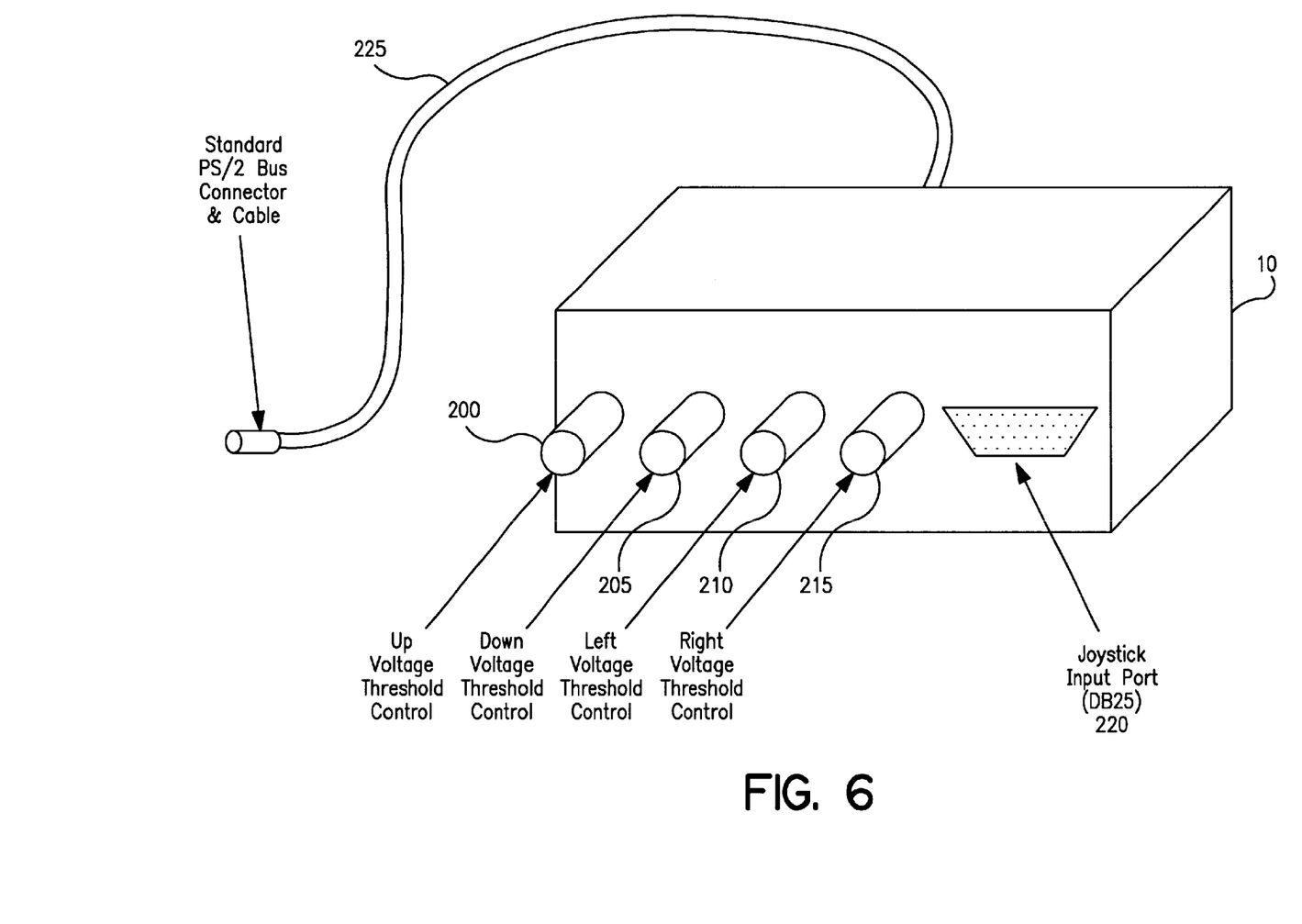
FIG. 6 is a pictorial representation of an embodiment of an embedded pointer controller; and, FIG. 7 is a detailed schematic circuit diagram of an embodiment of the embedded mouse controller of the present invention.

FIG. 6 is a pictorial representation of an embodiment of the embedded pointer controller 10. Four knobs provide an "Up Voltage" threshold control 200, a "Down Voltage" threshold control 205, a "Left Voltage" threshold control 210, and a "Right Voltage" threshold control 215. The present embodiment of the EPC 10 has joystick input port 220 for receiving a cable from a joystick which will carry the signals from the joystick to the EPC 10. The EPC 10 has a standard PS/2® bus connector and cable 225 to connect to a computer to receive signals.

Figure 7:
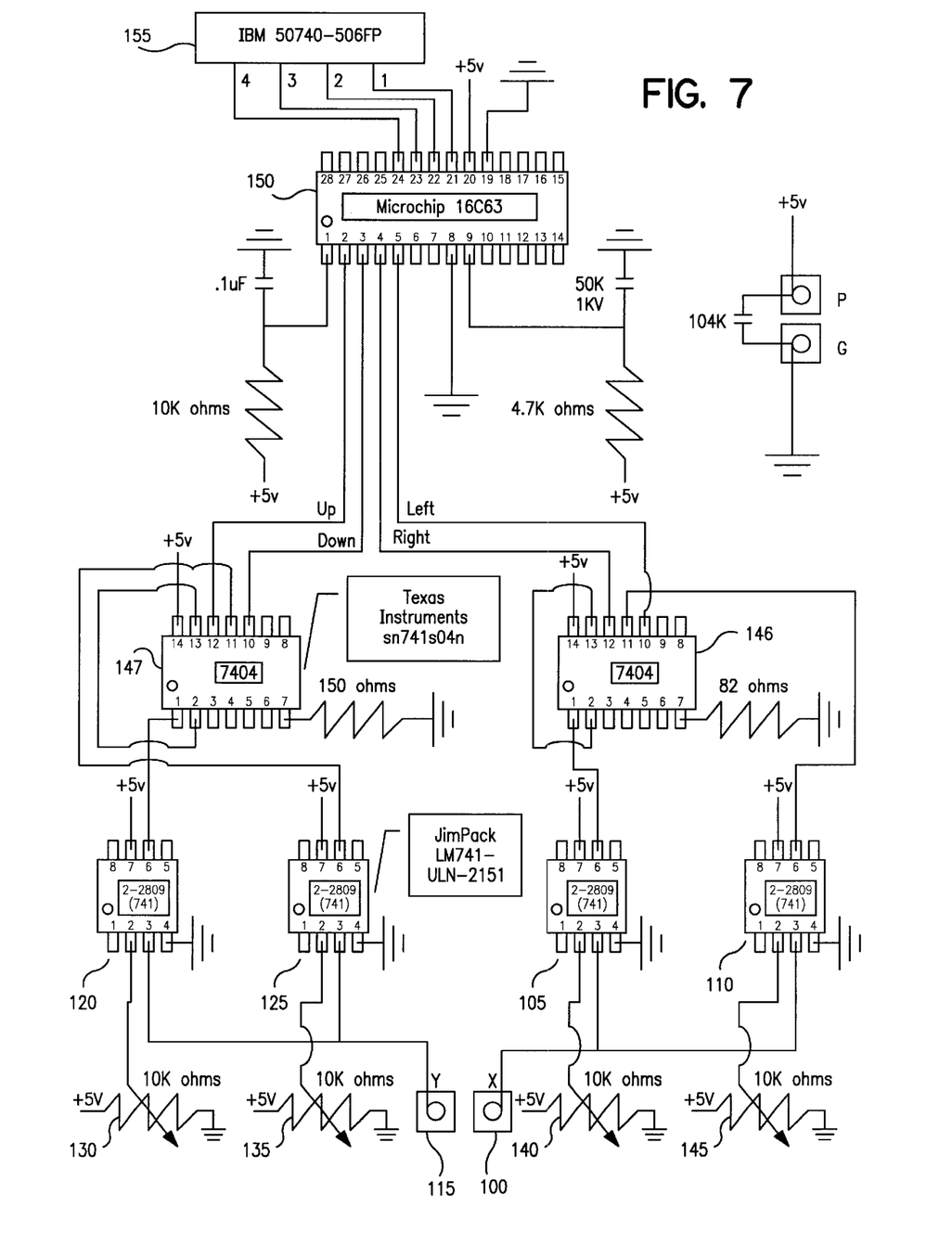

FIG. 7 is a more detailed schematic circuit diagram of an embodiment of the embedded mouse controller shown schematically in FIG. 4. The comparators 105, 110, 120, 125 are implemented using 741 chips such as those available from JimPack, part no. LM741-ULN-2151. The inverters 146, 147 are implemented using 7404 chips such as those available from Texas Instruments, Inc., part no. sn741s04n. The processor 150 is a microcontroller 16C63 which is available from Parallax, Inc. and other sources. The optical encoder mouse driver 155 is implemented using IBM Corp. optical encoder part no. 50740–506FP.

In alternative embodiments of the invention, the rate at which the pointer moves can currently be configured through a software change to adjust for various sized monitors. This could be tied to a slider or a dial.

Button input could be handled by the microprocessor. This makes it easy to associate features with various buttons. For instance, Joystick button B could be associated either with a middle button mouse click, or with a mouse left button double click. This could be tied to a switch on the box.

Additionally, software could be included to allow the embedded pointer controlled to function either as a PS/2®, or a Universal Serial Bus pointer controller. Expansion to the Universal Serial Bus would allow interaction with Macintosh hardware, as well as PC hardware. Again this could be tied to a button on the controller, or to a simple digital LCD interface.

If multiple interface options are provided, the EPC could autodetect which type of output is needed.

The entire Embedded Pointer Controller 10 can be reduced to a single chip with outputs for the PS/2® bus, and the Universal Serial Bus. The inputs could be two analog channels each capable of going from 0–5 volts for X and Y axis displacement, 3 digital inputs for the various digital inputs (buttons), and several lines for communication with the chip (RS-232, firewire, or USB) to set its parameters. These parameters would be held in firmware to be stored even when the device is disconnected. The parameters could include any of the options mentioned above.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A pointer controller interface for receiving signals from a transducer, comprising:

means for converting a first directional signal of said pointer controller to a second directional signal compatible with a PS/2® port;

means for translating a first discrete signal to a second discrete signal compatible with said PS/2® port;

means for establishing a plurality of voltage thresholds for scaling said transducer signals for use by a receiver having said PS/2® port, said establishing means further being responsive to said transducer and said pointer controller; and adapter means for carrying signals from said converting means and said translating means to said receiver having said PS/2® port, said adapter means formed and configured to adapt to said PS/2® port.

2. The pointer controller interface of claim 1, further comprising:

d) means for controlling speed of a pointer on said receiver.

3. The pointer controller of claim 1, further comprising:

a means for receiving control signals from said receiver receiving the directional and discrete signals.

4. The pointer controller of claim 3 wherein said control signals control sensitivity of the pointer controller to transducer signals.

5. The pointer controller of claim 3, further comprising:

means for controlling speed of a pointer on said receiver and wherein said control signals from said receiver set pointer speed at the pointer controller.

6. The pointer controller interface of claim 1 wherein said means for converting a first directional signal further comprises a microprocessor.

7. The pointer controller of claim 6 wherein said microprocessor converts said first directional signal to one or more 8 bit words.

8. The pointer controller of claim 6 wherein said means for converting further comprises at least one comparator, said comparator taking as a first input a voltage signal from the transducer, and as a second input a voltage signal through a variable resistor.

9. The pointer controller interface of claim 1 wherein said means for translating a first discrete signal further comprises an optical encoder mouse driver.

10. The pointer controller interface of claim 6, further comprising a discrete signal decoupler decoupling the transducer from said microprocessor.

11. The pointer controller interface of claim 6, further comprising a directional signal decoupler decoupling the transducer from said microprocessor.

12. The pointer controller interface of claim 6, further comprising a bus decoupler decoupling said microprocessor from a PS/2® bus.

13. The pointer controller interface of claim 6, further comprising a bus decoupler decoupling said microprocessor from a Universal Serial Bus.

14. The pointer controller interface of claim 1, further comprising:

means for converting said first directional signal to a third directional signal compatible with a Universal Serial Bus;

means for converting said first discrete signal with a third discrete signal compatible with said Universal Serial Bus; and adapter means formed and configured to adapt to said Universal Serial Bus in order to carry said third directional signal and said third discrete signal to a second receiver.

15. The pointer interface controller of claim 14, further comprising:

g) means for determining whether said PS/2® port is to receive signals or whether said Universal Serial Bus is to receive signals from the pointer controller interface.

16. The pointer controller interface of claim 1, further comprising:

means for associating said discrete signal with a specific action on said receiver.

17. The pointer controller interface of claim 16 wherein said specific action is an equivalent of an action resulting from a double-click of a mouse button.

18. A pointer controller interface for receiving signals from a transducer, comprising:

a microprocessor for converting a first directional signal of a pointer controller to a second directional signal compatible with a PS/2® port;

an optical encoder mouse driver for translating a first discrete signal to a second discrete signal compatible with said PS/2® port;

a plurality of voltage threshold controls for establishing a like plurality of voltage thresholds, said like plurality for scaling said transducer signals for use by a receiver having said PS/2® port; and, an adapter for carrying signals from said microprocessor and said optical encoder to said receiver.

19. A pointer controller interface system, comprising:

a transducer for generating pointer directional signals and at least one discrete signal;

means for converting a first directional signal of a pointer controller to second directional signal compatible with a PS/2® port;

means for translating a first discrete signal to a second discrete signal compatible with said PS/2® port;

means for establishing a plurality of voltage thresholds, said plurality for scaling said directional signals for use by a receiver having said PS/2® port; and, adapter means formed and configured to adapt to said PS/2® port to carry signals from said converting means and said translating means to said receiver.

20. The pointer controller interface system of claim 19, wherein the transducer is a joystick.

21. A pointer controller interface for receiving signals from a transducer, comprising:

means for converting a first directional signal of said pointer controller to a second directional signal compatible with a Universal Serial Bus;

means for translating a first discrete signal to a second discrete signal compatible with said Universal Serial Bus;

means for establishing a plurality of voltage thresholds for scaling said transducer signals for use by a receiver communicatively coupled to said Universal Serial Bus, said establishing means further being responsive to said transducer and said pointer controller; and adapter means for carrying signals from said converting means and said translating means to said receiver, said adapter means formed and configured to adapt to said Universal Serial Bus.

22. The pointer controller interface of claim 21 wherein said transducer is a joystick.

23. The pointer controller interface of claim 22 wherein said receiver is communicatively coupled to a computer.

24. The pointer controller interface of claim 22 wherein said establishing means further comprises:

a like plurality of variably adjustable resistors operatively coupled to comparators, said variably adjustable resistors further being operable by a user of said joystick.

* * * * *